United States Patent [19]

Giovannetti

[11] Patent Number: 5,040,758
[45] Date of Patent: Aug. 20, 1991

[54] LEVEL ADJUSTMENT DEVICE, PARTICULARLY FOR FURNITURE

[76] Inventor: Fiorello Giovannetti, Residenza Alberata - Milano 2, Segrate Milano, Italy

[21] Appl. No.: 511,793

[22] Filed: Apr. 20, 1990

[30] Foreign Application Priority Data

Apr. 21, 1989 [IT] Italy ............................. 20238 A/89

[51] Int. Cl.⁵ .......................................... F16M 11/00
[52] U.S. Cl. ................................. 248/188.4; 248/650
[58] Field of Search .............. 248/188.4, 188.2, 650, 248/649, 446; 254/103

[56] References Cited

U.S. PATENT DOCUMENTS

| | | | |
|---|---|---|---|
| 1,387,390 | 8/1921 | Haggenmiller | 248/188.4 |
| 1,417,639 | 5/1922 | Sterner | 248/188.4 |
| 1,526,156 | 2/1925 | Kinney . | |
| 1,528,287 | 3/1925 | Ajello | 248/188.4 |
| 2,738,952 | 3/1956 | Nilson | 254/103 |
| 3,104,493 | 9/1963 | Nalle | 248/188.4 |
| 3,653,341 | 4/1972 | Nielsen | 248/188.4 X |
| 4,915,334 | 4/1990 | White | 248/188.4 |

FOREIGN PATENT DOCUMENTS

| | | | |
|---|---|---|---|
| 472412 | 8/1914 | France | 248/188.4 |
| 729230 | 7/1932 | France . | |
| 729516 | 7/1934 | France . | |
| 777349 | 2/1935 | France . | |
| 1536424 | 12/1978 | United Kingdom . | |

*Primary Examiner*—Karen J. Chotkowski
*Attorney, Agent, or Firm*—Fleit, Jacobson, Cohn, Price, Holman & Stern

[57] ABSTRACT

A level adjustment device (10) comprises: a foot or base element (12) with a shaped part (20) and a threaded shank (24); a hollow, cylindrical operation or driving element, provided with female threaded parts and with a crown gear axially at one end; a support element (16) engaging in a stable manner the cylindrical operation element for axial movement and having an operation window (40).

By introducing the tip of a cross-pointed screwdriver of an usual type through the operation window, the cylindrical hollow element is rotated, thus moving it and the support axially along the foot element.

8 Claims, 3 Drawing Sheets

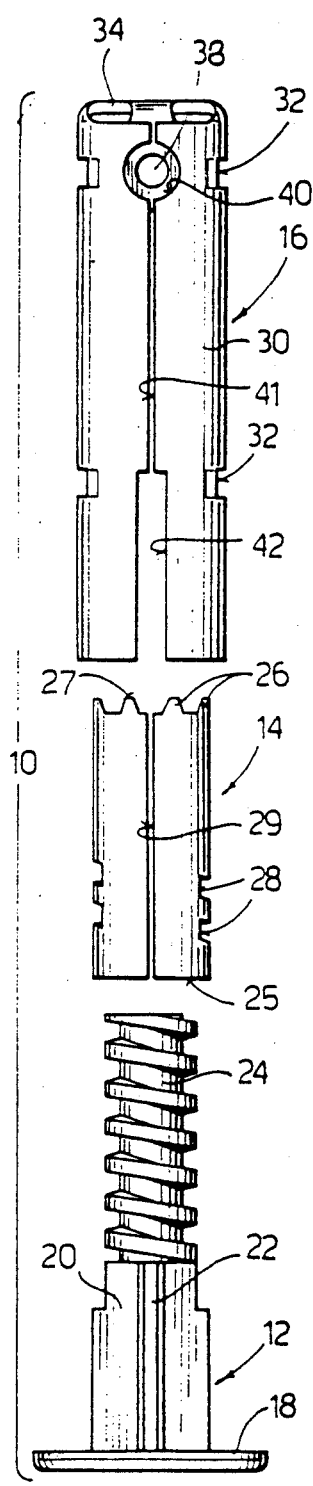
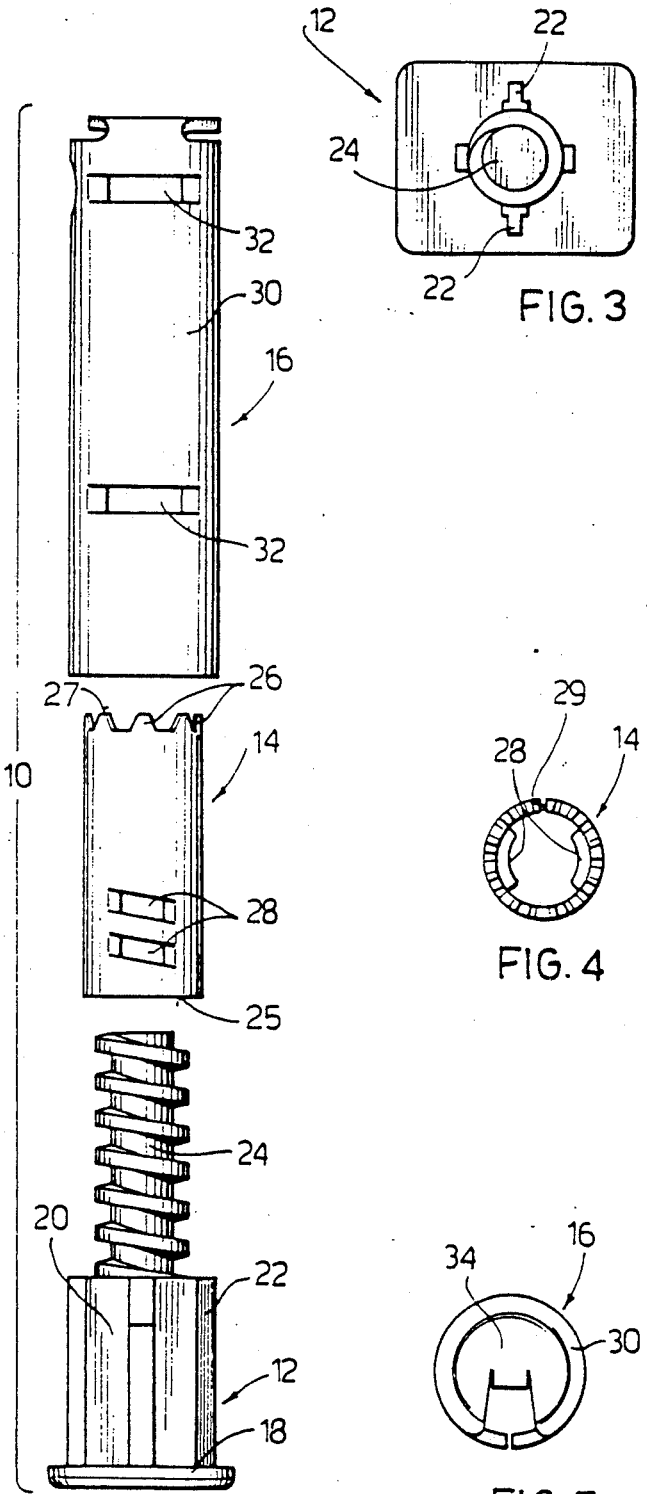
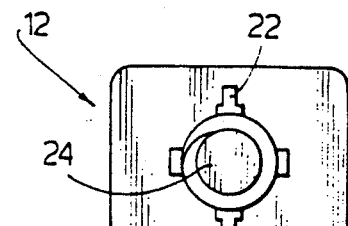
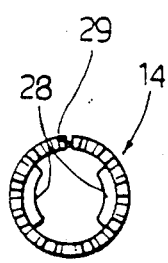
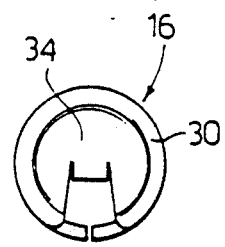

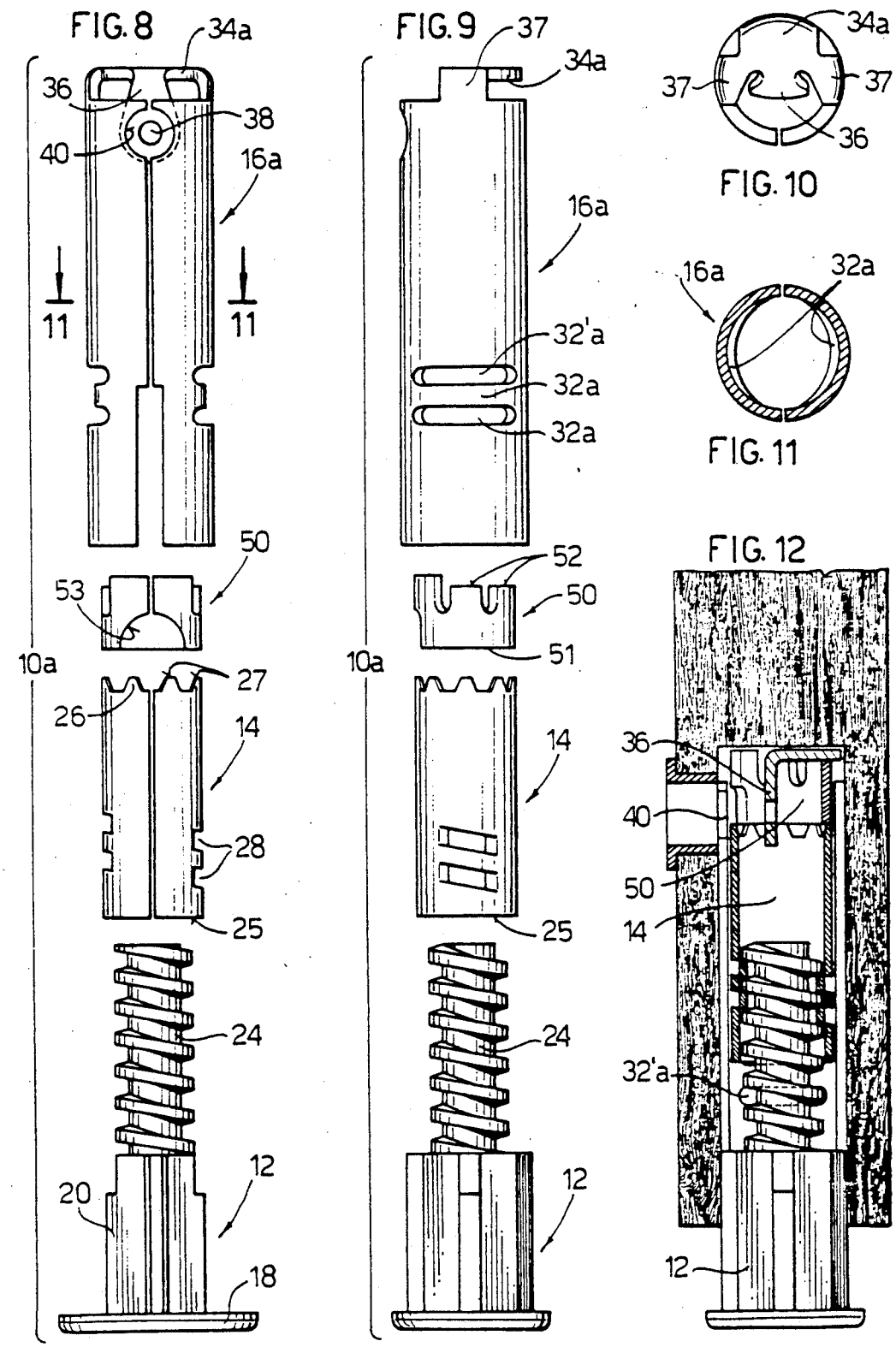

LEVEL ADJUSTMENT DEVICE, PARTICULARLY FOR FURNITURE

The present application refers to a device which can be used for lifting and lowering, particularly as a level adjustment for furniture.

In the furnishing field, for example, level adjustment devices are generally used where there is a particular need for two or more elements to be aligned horizontally.

Presently known level adjustment devices usually comprise a support foot connected by means of a screw system to a bracket bearing the element whose position is desired to be adjusted. One drawback with such a device is that the weight of the piece of furniture whose position is required to be adjusted is carried in an offset position with respect to the axis of the adjustment device, thus creating complex stresses which tend to warp the screw device itself and, after all, obstruct its working. In addition the adjustment is carried out with a screwdriver in direct contact on the screw or threaded shank; this means that a considerable torque must be applied on the screwdriver to carry out the adjustment and, sometimes, when the piece of furniture is loaded, such adjustment becomes impossible.

One aim of this invention is to realize an adjustment device on which the load can be borne in a centred manner.

A further aim is to realize a device which can be easily operated without excessive efforts.

A further aim is to realize a device which is easy to produce and assemble and, nevertheless, sturdy, accurate and reliable.

The above aims have been achieved with a device comprising three cooperating elements, a base element or foot with a screwthreaded shank; a driving or operation sleeve-like element, having female threaded segments for engaging the screw shank and an axial crown gear at the upper end; an external support element intended to be joined to the element whose position is required to be adjusted, the support element being axially movable together with the operation element but the latter being free to rotate with respect to the support element; the support element having an access opening for operating the crown gear of the operation element. The base element is preferably made of molded metal and the sleeve and the support are made of bent sheet metal blank. Moreover a fourth annular element is put preferably between the support element and the teeth of the driving element, for a better load distribution.

The new level adjustment is not very cumbersome and can be mounted within the thickness of a piece of furniture and therefore centred with respect to a load. It can be easily adjusted by means of a cross-head or cross-pointed screwdriver of a type normally available on the market, positioned perpendicularly to the axis of the threaded shank; the adjustment requires less effort than traditional level adjustment; finally, it avoids unaesthetic external encumbrances.

In addition it can be mass-produced at a moderate cost. Finally, it has the further advantage of fulfilling the fire resistance requirements laid down by recent fire regulations.

Embodiments of the invention will now be described with reference to the enclosed drawings, in which:

FIG. 1 is an exploded front view of a first embodiment of the adjustment device;

FIG. 2 is an exploded side view of the device in FIG. 1, taken from the right with respect to FIG. 1;

FIG. 3, FIG. 4 and FIG. 5 are plan views of each of the three elements composing the device of the preceding figures;

FIG. 8 is an exploded front view, similar to FIG. 1, of a second embodiment of the device;

FIG. 9 is an exploded side view of the device in FIG. 8;

FIG. 10 is a plan view of the support element;

FIG. 11 is a sectional view according to 11—11 in FIG. 8;

FIG. 12 is an axial sectional view across the second embodiment of the device, shown mounted in a panel.

Figure 6:
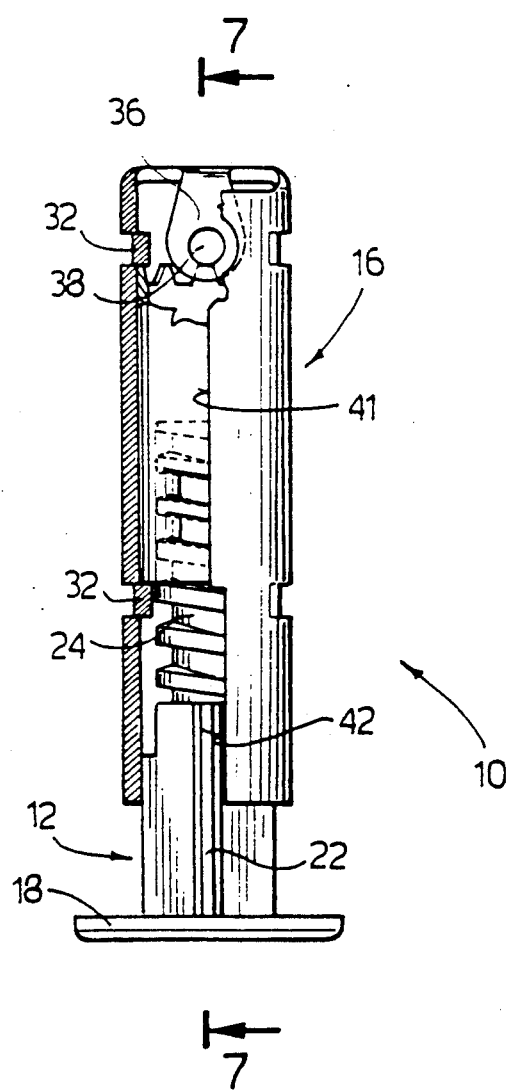
FIG. 6 is a part sectional front view of the assembled device.

Referring to the figures, a first embodiment of the device as a whole bears reference number 10 and comprises a base element or foot 12, an operating or driving element 14 and a support element 16.

The base element 12 has a bearing plate 18 integral with an upright 20 provided with opposed vertical projections 22. A pin or threaded shank 24 having a trapezoidal screw thread, for example, is integral or coaxial with the upright. The element 12 is generally made of molded metal.

The element 14 has a substantially cylindrical shape which is circular in plan view; it has a toothing with axial teeth 26 at the upper end in the figure, and has oblique recess portions 28, projecting inwards, in such a way as to form lengths of female threading for engaging the threaded shank 24. The element 14 can easily be produced from bent sheet metal blank; two edges 29 of the sheet metal remain facing without being joined to each other, so as to give the element a certain elasticity in the circumferential direction.

The support element 16 comprises a body 30 which is circular or other in plan view, having an internal diameter sufficient to receive the element 14. The body 30 has two internal projections 32 on opposed sides, to form axial position abutments or locators for the cylinder 14. A head part 34 has a vertical tongue 36 with a hole or eyelet 38 and, in front of this, an operation window or slot 40. Two diametrically opposed openings 42 allow to engage the projections 22 on the upright, to prevent reciprocal rotation without restraining reciprocal axial sliding.

The support element 16 can be easily produced from bent sheet metal blank, leaving a small hollow space between the vertical edges 41, 41 and 42, 42 of the sheet metal, in order to obtain a certain elasticity in assembling.

In the assembled device, shown in FIGS. 4 and 5, the female thread element 14 remains engaged on the threaded shank 24 with the parts 28 thereof, and can rotate and move axially on it.

The support element 16, which is resiliently assembled with element 14 and around it, coaxially with it, remains coupled with it through projections 32, which engage the upper and lower edges, 25 and 27, of the element 14; element 16 is thus restrained to element 14 for its axial movement with respect to the element 12, while element 14 is free to rotate within element 16.

Figure 7:
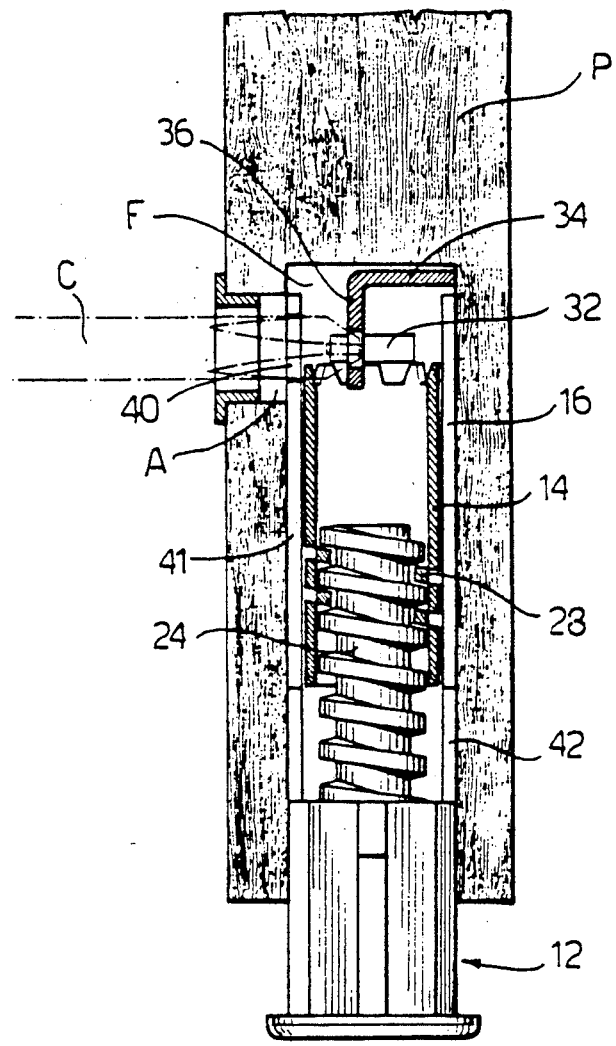
FIG. 7 is an axial sectional view through the device of the preceding figures, mounted in a panel; the section is taken along plane 7—7 in FIG. 6, the head of an operation screwdriver is drawn with dash-dot lines.

In FIG. 7 a panel P is shown, with a housing, generally in the shape of a cylindrical hole F, in which the device 10 is received, with the support 16 forced into said hole F. An operation opening A is provided in the panel in correspondence with the slot 40.

In operation, a cross-pointed screwdriver C is inserted into the opening A and into the slot 40 until its tip is housed in the hole 38. In this position, the cross-shaped tip of the screwdriver engages the toothing 26. When the screwdriver is rotated on its own axis, it rotates element 14 on a vertical axis, within element 16 which does not rotate; element 14 is therefore shifted vertically along the threaded shank 24 of the element 12, upwards or downwards.

In the embodiment shown in FIGS. 8 to 12, and generally indicated with reference number 10a, the elements corresponding to those of the device 10 bear the same reference numbers and won't be illustrated in detail. Level adjustment 10a comprises: a base element 12, a driving element 14, a support element 16a, and annular stress distributing element 50.

The support element 16a, made of sheet metal, has a pair of inner projections 32a, defined by openings 32'a, the upper edge of which is apt to engage with a lower edge 25 of driving element 14. An upper edge 27 of the teeth of driving element 14 abuts against lower edge 51 of annular element 50 and a head part 34a of element 16a abuts against upper edge 52 of annular element 50. Also annular element 50 is made up of bent sheet metal blank and presents a front slot 53 suitable for being put in line with the window 40.

Preferably, the upper part of element 50 presents a toothing, so as to have some teeth bent inwards, to fit the head part 34a. The latter is preferably restrained to the body of element 16 along two bent lateral portions, 37.

I claim:

1. A level adjustment device comprising a base element having a threaded shank, a tubular shaped driving element threaded on the shank, a tubular shaped support element coaxial with said base element and driving element, the support element enclosing the driving element, the support element being coupled to the driving element for rotation relative to the driving element and axial movement integrally with the driving element, the support element being non-rotatably coupled to the base element and being axially movable thereon, the driving element having a castellated upper edge with axially upwardly extending teeth, and the support element having a lateral opening in alignment with said castellated upper edge for inserting an operating means to mesh with said teeth and rotate the driving element thereby axially moving the driving element and support element relative to the base element.

2. A device according to claim 1 in combination with an operating means comprising a cross-head screw driver inserted in said opening and meshing with said teeth.

3. A device according to claim 1, characterized in that said support element has a position locator eyelet for said operating means.

4. A device according to claim 1 including a coupling between the driving element and the base element comprising a worm-worm screw coupling, characterized in that said driving element is made from bent sheet metal blank, said worm screw consists of spaced out pressed projections.

5. A device according to claim 1 characterized in that said support element is made from bent sheet metal blank, having inwardly extending projections for engaging with the driving element.

6. A device according to claim 5, characterized in that said support element has vertical edges edge to edge and openings for engaging vertical projections on the base element.

7. A device according to claim 1 which further comprises a stress distributing element between the teeth of the driving element and the support element.

8. A device according to claim 7, characterized in that said stress distributing element is annular-shaped, is made of sheet metal and has a front opening to allow the passage of the operating means.

* * * * *